United States Patent [19]

Le et al.

[11] Patent Number: 4,728,969

[45] Date of Patent: Mar. 1, 1988

[54] AIR ASSISTED INK JET HEAD WITH SINGLE COMPARTMENT INK CHAMBER

[75] Inventors: Hue P. Le, Aloha; Joy Roy; Ronald L. Adams, both of Portland; James C. Oswald, Beaverton; Jeffery J. Anderson, Portland, all of Oreg.

[73] Assignee: Tektronix, Inc., Beaverton, Oreg.

[21] Appl. No.: 884,845

[22] Filed: Jul. 11, 1986

[51] Int. Cl.[4] .............................................. G01D 15/18

[52] U.S. Cl. .................................................. 346/140 R

[58] Field of Search .......................................... 346/140

[56] References Cited

U.S. PATENT DOCUMENTS 3,747,120 7/1973 Stemme .......................... 346/140 X
3,940,773 2/1976 Mizoguchi .......................... 346/140
4,106,032 8/1978 Miura .................................. 346/140
4,312,010 1/1982 Doring .
4,380,018 4/1983 Andoh et al. .
4,518,974 5/1985 Isayama .
4,549,188 10/1985 Shackleton .
4,613,875 9/1986 Le ....................................... 346/140

FOREIGN PATENT DOCUMENTS 106871 8/1981 Japan .

OTHER PUBLICATIONS

International Business Machines Technical Disclosure Bulletin, vol. 22, No. 6, published Nov. 9, 1979, pp. 21333-2334.

"Nikkei Electronics": Dec. 5, 1983, pp. 87-89.

"The Effect of Head Dimensions on Drop Formation in Drop-On-Demand Ink-Jet Printing", Takada et al., SID Symposium Digest, 1985, pp. 317-320.

"Droplet Emission with Micro-Planar Ink Drop Generators", Doring et al., SID Symposium Digest, 1984, pp. 364-367.

*Primary Examiner*—Joseph W. Hartary

*Attorney, Agent, or Firm*—John D. Winkelman; David P. Petersen

[57] ABSTRACT

An air-assisted drop-on-demand ink jet head 10 has a single compartment ink chamber 14 and is designed for operation over a wide range of ink drop repetition rates, including extremely high repetition rates, such as twenty kilohertz. The components included in the ink jet head have natural resonance frequencies which are greater than the desired maximum drop generation frequency of the ink jet head. In addition, the natural frequency of each of the components of the ink jet head are sufficiently different from one another to prevent intercoupling. Ink is supplied to the ink chamber 14 via a supply inlet passageway 38 which has a cross-sectional area which is sized large enough to allow the supply of ink to the ink chamber. Yet, this area is small enough so that the natural frequencies of ink in the ink inlet do not significantly alter drop generating pressure pulses in the ink chamber 14.

17 Claims, 7 Drawing Figures

AIR ASSISTED INK JET HEAD WITH SINGLE COMPARTMENT INK CHAMBER

TECHNICAL FIELD

This invention relates to ink jet heads for ink jet printers, and in particular to an air assisted drop-on-demand ink jet head with a single compartment ink chamber.

BACKGROUND OF THE INVENTION

Ink jet printers having one or more ink jet heads for projecting drops of ink onto paper or other printing medium to generate graphic images and text have become increasingly popular. To form color images, ink jet printers with multiple ink jet printing heads are used, with each head being supplied with ink of a different color. These colored inks are then applied, either alone or in combination, to the printing medium to make a finished color print. Typically, all of the colors needed to make the print are produced from combinations of cyan, magenta and yellow inks. In addition, black ink may be utilized for printing textual material or for producing true four-color prints.

In a common arrangement, the print medium is attached to a rotating drum, with the jet heads being mounted on a traveling carriage that traverses the drum axially. As the heads scan paths over the printing medium, ink drops are projected from a minute external orifice in each head to the medium so as to form an image on the medium. A suitable control system synchronizes the generation of ink drops with the rotating drum.

To produce images of certain colors, more than one color of ink is combined on the medium. That is, ink drops of a first color are applied to the medium and then overlayed with ink drops of a second color to produce the desired color of the image. If the drops do not converge on the same position on the medium, that is, the drops of the two colors do not overlay one another, then the color of the image is distorted. Furthermore, it is also important that drops of substantially uniform size and shape be generated by the ink jet heads. To the extent that the drops are non-uniform, the image is distorted. This distortion affects the clarity of textual images as well as of pictoral images.

In one basic type of ink jet head, ink drops are produced on demand. An exemplary drop-on-demand ink jet head is illustrated in U.S. Pat. No. 4,106,032 of Miura, et al. The Miura et al jet head has a two compartment ink chamber comprised of an inner horn compartment and an outer ink compartment which communicate with one another through a connecting channel of restricted cross section. Ink is delivered to the outer ink compartment of the ink jet head. Whenever a drop of ink is needed, an electric pulse is applied to a piezoelectric crystal, causing the crystal to constrict. As a result, because the crystal is in intimate mechanical contact with ink in the horn compartment, a pressure wave is transmitted through the ink chamber. In response to this pressure wave, ink flows from the outer ink compartment and through an ink orifice passageway in an ink chamber wall and forms an ink drop at an internal ink drop-forming orifice outlet located at the outer surface of the ink chamber wall. The ink drop passes from the drop-forming orifice outlet and through an air chamber toward a main external orifice of the ink jet head. This latter orifice is aligned with both the internal orifice and the connecting channel and also leads to the printing medium. Air under pressure is delivered to the air chamber and entrains the drop of ink in a generally coaxial air stream as the ink drop travels through the air chamber. This air stream increases the speed of the drops toward, and the accuracy of applying the drops to, the print medium.

The only prior art ink jet heads capable of stable operation at an ink drop generation rate of up to twenty kilohertz have such a two-compartment ink chamber in combination with an air assist. However, there are a number of drawbacks associated with a two-compartment ink chamber design. For example, they are relatively expensive to fabricate. In addition, it is difficult to align the connecting passageway, internal ink drop-forming orifice outlet, and main external orifice outlet of this type ink jet head. Furthermore, the connecting passageway can become clogged with contaminants and, because of its internal location and size, is difficult to clean. In addition, it is very difficult to remove air bubbles from the inner horn compartment through the connecting passageway to purge such bubbles from the ink jet heads. Bubbles can interfere with the drop ejection performance of the jet head. Also, in implementations of the Miura et al type ink jet head known to the present inventors, relatively high drive voltages (i.e. 180–200 volts peak to peak) must be applied to the actuator in order to generate ink droplets, particularly at higher drop repetition rates. Consequently, drive transformers and other circuit complexities are introduced in order to obtain drive signals of this magnitude.

Another form of air assisted ink jet nozzle is disclosed by W. L. Dollenmayer in an International Business Machines Technical Disclosure Bulletin, Vol. 22 No. 6, pp. 2333–34 published Nov. 9, 1979. This bulletin discloses a single compartment ink chamber within a nozzle. The ink chamber has an ink outlet which is surrounded by a secondary air nozzle outlet which receives low pressure air. The air nozzle and ink outlets terminate in the same plane. Therefore, ink from the ink nozzle outlet does not pass through an air chamber and then through another orifice as in the case of the Miura et al design. The ink jet nozzle of this reference operates at a relative low typical maximum drop repetition rate, (i.e. 4 to 6 kilohertz). Relative higher air velocity, which would allow a higher drop repetition rate, cannot be used in this design. In such a case, the air would tend to spontaneously pump ink from the ink nozzle regardless of whether a pulse is applied to the ink. This would result in the generation of ink droplets at undesired times.

Another prior art ink jet head, developed by NEC is disclosed in the Dec. 5, 1983 issue of "NIKKEI Electronics." This ink jet head utilizes a cylindrical piezoelectric element which expands and contracts in response to driving signals. When the element contracts, an ink chamber surrounded by the element is squeezed to eject a drop of ink from a conical nozzle. Ink passes through a rectifying valve to the ink chamber and a fluid resistance element is placed at the nozzle side of the ink chamber. A larger fluid resistance is present at the nozzle side of the resistance element than at the rectifying valve so as to prevent reverse flow of ink through the chamber. Also, this article has one figure which appears to disclose a nozzle with a tip inserted partially into an opening through a plate. Air flows along the surface of the nozzle and through the opening through the plate.

This NEC ink jet head has a number of drawbacks. The use of valve and resistance elements adds manufacturing complexities. Also, the NIKKEI Electronics article mentions problems in driving the disclosed ink jet head above five kilohertz without the rectifying valve. Also, drop frequencies seem to be limited to about ten kilohertz, even with the valve. In addition, relatively low air and ink pressures are apparently employed as the air flow is understood to move at approximately the speed of the ejected ink drops. Consequently, the air does not significantly accelerate the generated ink drops. Furthermore, in a design in which the nozzle tip is inserted into an opening through a plate, the air flow, if increased in velocity, would tend to pull ink from the nozzle tip even in the absence of a pulse from the piezoelectric element. This would result in the ejection of undesired ink drops.

U.S. Pat. No. 4,380,018 of Andoh et al., at FIG. 18, discloses still another form of air assisted ink jet head which has a two compartment ink chamber. Thus, this device suffers from drawbacks similar to those discussed above in connection with the Miura et al. patent. In addition, the Andoh et al. patent, as well as U.S. Pat. Nos. 4,549,188 of Shackelton, 4,312,010 of Doring, 4,518,974 of Isayama and 3,940,773 of Mizoguchi et al. disclose a variety of non-air assisted ink jet heads with single or the double compartment ink chambers. For example, FIG. 9 of the Shackleton patent shows a single ink chamber non-air assisted ink jet head having a first section of a first diameter and a second section, adjacent an orifice outlet, of a reduced diameter. Non-air assisted ink jet heads suffer from a number of drawbacks when compared to air-assisted heads, primarily in the fact that such non-air assisted heads apply drops of ink to printing medium at limited frequency rates, such as from four kilohertz to six kilohertz.

Therefore, a need exists for an improved air-assisted drop-on-demand ink jet head which is directed toward overcoming these and other disadvantages of prior art devices.

SUMMARY OF THE INVENTION

An air-assisted drop-on-demand ink jet head has a single compartment ink chamber which has an ink supply inlet for receiving ink under pressure and an ink chamber wall with a valve free ink orifice passageway leading to an internal ink drop-forming orifice outlet. An actuator, such as a piezoelectric device, applies a pressure pulse to the ink chamber so as to cause ink to flow through the ink orifice passageway and produce an ink drop at the internal ink drop-forming orifice outlet. The ink jet head has an air chamber with an air chamber wall through which an external ink jet head orifice is provided in axial alignment with the internal ink drop-forming orifice outlet. The air chamber receives pressurized air which flows inwardly from the sides of the air chamber and forms a generally coaxial air stream surrounding the internal ink drop-forming orifice outlet. This air stream is directed outwardly from the external ink jet head orifice. The air stream carries ink drops produced at the internal ink drop-forming orifice outlet, in response to pressure pulses from the actuator, outwardly through the external ink jet head oriface and toward printing medium. The components forming the ink jet head are designed such that the natural resinance frequencies of these components are greater than the maximum operating frequency. That is, greater than the maximum frequency at which pressure pulses are generated by the actuator. In addition, the natural frequency of each of the components are sufficiently different from one another to prevent inter-coupling. Also, the ink supply inlet has a cross-sectional area which is large enough to allow the supply of ink to the ink chamber during operation of the ink jet head, yet small enough so that the natural frequencies of ink in the ink inlet do not significantly interfere with the pressure pulses in the ink chamber.

It is accordingly one object of the invention to provide an air assisted drop-on-demand ink jet head with a single compartment ink chamber which is capable of producing ink drops of uniform size and shape over a wide range of drop repetition rates, including extremely high repetition rates, such as twenty kilohertz.

Another object of the invention is to provide an air assisted drop-on-demand ink jet head with a single compartment ink chamber, which produces ink drops in response to pressure pulses from an actuator, and in which a relatively low and constant drive voltage is required for the actuator.

A further object of the invention is to provide an air assisted drop-on-demand ink jet head which minimizes manufacturing difficulties and expense and, in one form, eliminates the need for expensive cast parts.

It is still another object of the present invention to provide an air assisted drop-on-demand ink jet head which can easily be incorporated into a multiple ink jet head array.

Another object of the present invention is to provide an ink jet head which is relatively easy to purge of contaminants and air bubbles.

These and other objects, advantages and features of the present invention will become apparent with reference to the following detailed description and drawings.

DETAILED DESCRIPTION OF PREFERRED EMBODIMENTS

Figure 1:
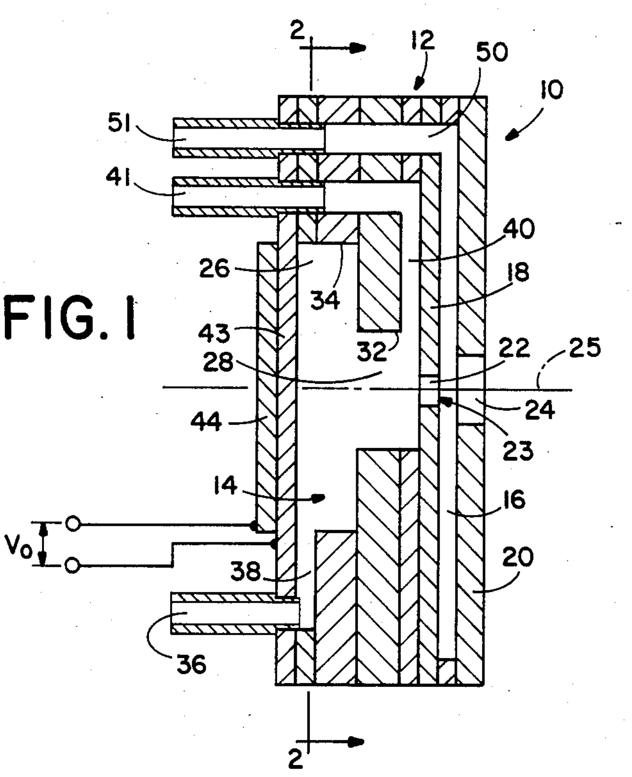
FIG. 1 is a vertical sectional view of one form of an ink jet head in accordance with the present invention.
Figure 2:
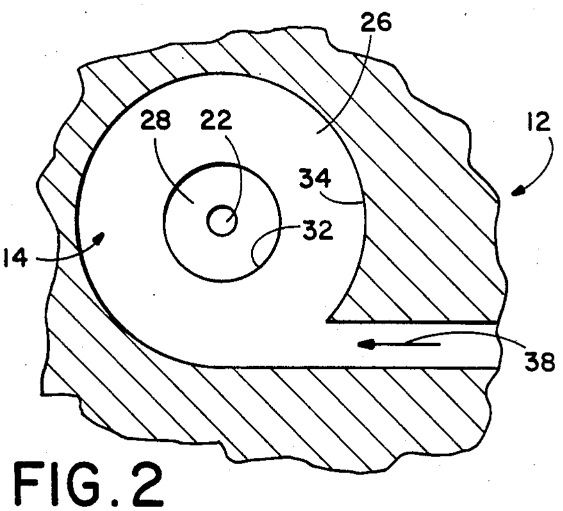
FIG. 2 is a vertical sectional view of a portion of the ink jet head of FIG. 1, taken generally along lines 2—2 of FIG. 1.
Figure 3:
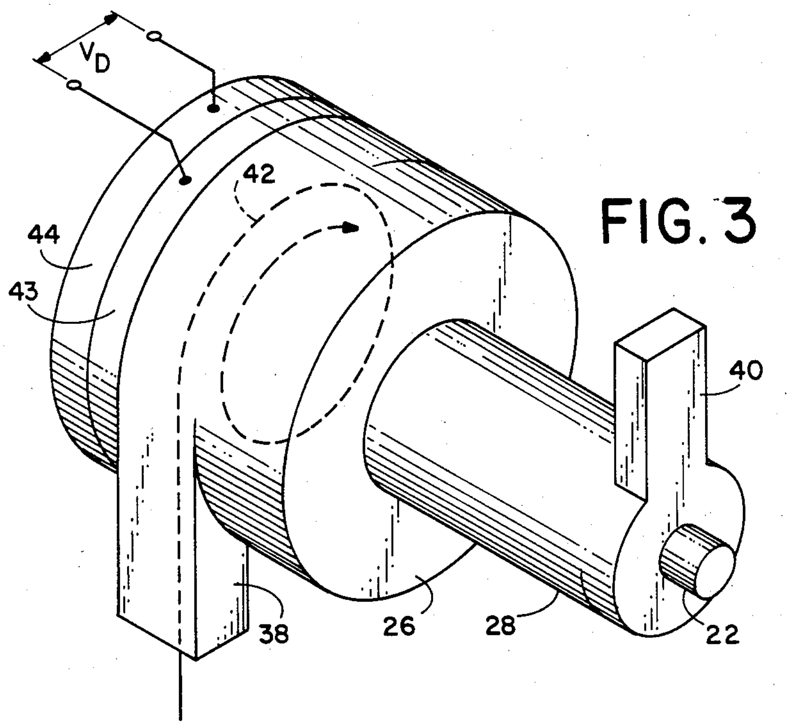
FIG. 3 is an illustration of the shape of the single compartment ink chamber of the ink jet head of FIG. 1.

With reference to FIGS. 1–3, an ink jet head 10 includes a body 12 within which a single compartment ink chamber 14 and a air chamber 16 are provided. The ink chamber 14 is separated from the air chamber 16 by an ink chamber wall 18. Also, the air chamber 16 is closed by an air chamber wall 20. The ink chamber 14 communicates with the air chamber through an internal ink orifice passageway 22, which is provided through the ink chamber wall 18. The ink orifice passageway 22 opens to air chamber 16 through an internal ink drop-forming orifice outlet 23. An external ink jet orifice 24 passes from the air chamber to the exterior of the ink jet head 10. Ink jet orifice 24 is axially aligned with ink orifice passageway 22 and orifice outlet 23, as indicated by axis 25.

In the FIG. 1 form of the invention, ink chamber 14 is comprised of two sections 26, 28 of generally circular cross section. Section 28 is positioned adjacent to the wall 18 and ink orifice passageway 22 and is also bounded by an interior wall 32 of ink jet head body 12. Section 26 is of greater diameter than section 28, and is bounded by an interior wall 34. The sections 26, 28 are symmetric about the axis 25.

Ink under pressure is delivered to an ink receiving inlet 36, flows through an ink passageway 38, and fills the ink chamber 14 within the ink jet head.

For purposes of facilitating the purging of contaminants and air bubbles from the ink jet head, as explained in greater detail below, ink is directed into the base of ink chamber 14 so as to be tangential to the wall 34. Also, an ink chamber purging outlet 41, communicating through a purging passageway 40 with chamber section 28 adjacent the interior surface of wall 18, is provided for use in selectively purging air bubbles and contaminants from ink chamber 14. Ink inlet passageway 38 and purging passageway 40 are positioned so that ink travels in a non-linear path between the inlet and purging outlet during the purging process. As explained below, this assists in sweeping air bubbles and contaminants from the ink chamber. More specifically, as indicated generally by arrow 42 in FIG. 3, ink travels in a vortical or cyclone-like path between the ink inlet passageway 38 and the purging passageway 40.

The end of ink chamber 14 opposite ink orifice outlet 22 is closed by a flexible membrane or diaphragm 43, such as of stainless steel. A piezoelectric crystal 44, together with membrane 43 comprises one form of a pressure pulse generating actuator. In response to electrical pulses, a pressure wave is transmitted through the ink chamber 14. This causes the ejection of an ink droplet from the ink drop-forming orifice outlet 23 and toward the external orifice 24.

Pressurized air is delivered to an air inlet 51 of the ink jet head 10 and flows through a passageway 50 to the air chamber 16. Air is distributed about the circumference of the ink jet head between the outer surface of ink chamber wall 18 and the inner surface of the air chamber wall 20. More specifically, air flows inwardly from all directions through the air chamber 16 toward the center of the ink jet head. As air approaches the center of the head, it changes direction and flows outwardly through the external orifice 24. This air flow accelerates ink drops generated at ink drop-forming orifice 23 in response to pressure pulses and assists in carrying them outwardly from the ink jet head. As a result, uniform and symmetric ink drops are generated by the ink jet head. These drops travel through the external orifice 24 and toward the printing medium. Although not shown in FIG. 1, a projection, such as of conical shape, may be positioned on the outer surface of ink chamber wall 18. In such a case, ink orifice passageway 22 would pass through this projection and the ink orifice outlet 23 would be located at the top of the projection. This projection assists in deflecting the air outwardly through the external orifice 24.

In a typical application, an exemplary air pressure is thirty inches of water and an exemplary ink pressure is twenty-five inches of water. Thus, a typical pressure differential between the air and ink pressures is five inches of water. However, pressure differentials of from approximately three to ten inches of water are suitable for optimum operation.

Figure 4:
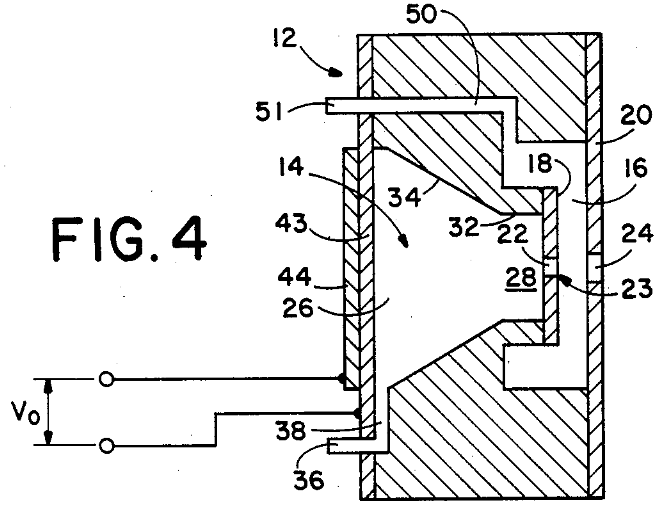
FIG. 4 is a vertical sectional view of an alternate embodiment of an ink jet head in accordance with the present invention.

The FIG. 4 form of ink jet head is much like the FIG. 1 form. Consequently, components of the FIG. 4 ink jet head are designated with the same number as corresponding components of the FIG. 1 ink jet head. In general, the FIG. 4 form of the invention eliminates the optional purging outlet. In addition, ink chamber section 26 of the FIG. 4 form of ink chamber 14 is generally of frustoconical shape. However, the chamber 14 may be cylindrical or of other shapes.

The FIG. 1 form of ink jet head may be manufactured by simply laminating together sheets of material which have been drilled or fabricated with the appropriate openings. Because of this relatively simple manufacturing technique, it is extremely easy to align ink drop-forming orifice 23 and the external orifice 24. It is also easy to manufacture arrays of multiple ink jet heads. In comparison, the ink jet head of FIG. 4 typically includes some cast or machined parts.

Ink jet heads in accordance with the present invention are capable of operation at an extremely high print operating or ink drop-production rates, such as from zero to twenty kilohertz. At the same time, the complexities and difficulties introduced by having a drop-on-demand ink jet head with a two compartment ink chamber separated by a restricted orifice, are avoided. To achieve this result, an ink jet head in accordance with the invention is designed such that the natural frequencies of the components of the head are greater than the maximum desired operating frequency of the head. Furthermore, the natural frequencies of each of the components are sufficiently different from each other to prevent intercoupling of these elements. Such intercoupling could block the ink drop-production. In addition, the ink supply passageway 38 is designed to have a cross-sectional area that is large enough to allow the supply of ink into the ink chamber 14. At the same time, the cross-sectional area of ink inlet passageway 38 is small enough to prevent the natural frequencies of the ink in the ink inlet passageway from significantly interfering with pressure pulses generated by the piezoelectric crystal 44 within the ink chamber 14. That is, the frequency of ink in the inlet does not significantly alter the damping ratio, magnitude, or frequency of the pressure pulses in the ink chamber. Typically, the purging outlet 44 is about the same size as the ink inlet. However, the size of the ink inlet has a greater effect on the performance of the ink jet head because ink is supplied through this inlet during drop formation.

In connection with this design, the ink orifice passageway and ink chamber are sized such that the natural frequency of ink in the ink passageway 22 is equal to or greater than seventy-five percent of the maximum operating frequency. Furthermore, to prevent drop resonance, the ink jet head is typically designed such that the natural frequency of ink in the ink orifice passageway 22 is outside of the range of from ninety to one hundred and ten percent of the maximum operating frequency. This natural frequency is primarily dependent upon the dimensions of the ink orifice passageway 22 and on the overall volume of the ink chamber.

In addition, the actuator assembly comprised of piezoelectric crystal 44 and diaphragm plate 43, should have a natural frequency of greater than two hundred and fifty percent of the maximum operating frequency of the ink jet head. Preferably, the natural frequency of this assembly should be between one hundred kilohertz and two hundred kilohertz assuming an ink jet head operable at up to twenty kilohertz is desired.

Also, when the ink chamber is filled with ink, the axial acoustic frequency, in the direction of axis 25 and dependent upon the axial distance between the diaphragm plate 43 and ink chamber wall 18, should preferably be from four hundred kilohertz to eight hundred kilohertz. This again assumes that an ink jet head operable at up to twenty kilohertz is desired. Also, the natural frequency of the ink chamber wall 18, for an ink jet head operable at up to twenty kilohertz, should preferably be greater than or equal to eight hundred and fifty kilohertz.

Carrying this further, the ink orifice passageway is sized such that the natural resonance frequency of ink inside the ink orifice passageway is greater than sixteen kilohertz. In addition, the actuator assembly typically generates a peak positive pressure within the ink chamber which is from about five pounds per square inch to about twenty pounds per square inch. Also, the actuator assembly generates a peak negative pressure within the ink chamber which is from about negative five pounds per square inch to about negative two pounds per square inch.

It will of course be appreciated by those skilled in the art that some deviation from the above frequencies still results in a satisfactorily operable jet head. Again, however, in general the natural frequencies of a the components of the single ink chamber ink jet head should be greater than the maximum operating frequency and should also be isolated from one another.

To further describe the invention, and with reference to FIG. 1, the following table lists typical and preferable dimensions for the components identified in this figure. It should be noted that the column identified as "range" is not to be taken as listing the outer limits of suitable dimensions but is a range over which the most satisfactory operation of the ink jet head is believed to result. Finally, the column labeled "preferred" is the dimension for which optimal results are indicated from testing to date.

TABLE

| Element | Range | Preferred |
|---|---|---|
| A. Thickness of Piezoelectric Crystal 44 | 151 μm–411 μm | 281 μm |
| B. Thickness of Diaphragm 43 | 75 μm–261 μm | 131 μm |
| C. Cross Section of Ink Inlet Passageway 38 | 9311 μm²–31,311 μm² | |
| D. Cross Section of Ink Ink Outlet Passageway 40 | 9311 μm²–31,311 μm² | |
| E. Ink Chamber Length (along axis 25 from Diaphragm 43 to Ink Chamber wall 18) | 761 μm–2551 μm | 1151 μm |
| F. Thickness of Ink Chamber Wall 18 | 51 μm–131 μm | 75 μm |
| G. Diameter of Ink Orifice Passageway 22 | 31 μm–71 μm | 51 μm |
| H. Width of Air Chamber 16 (from Ink Chamber Wall 18 to Air Chamber Wall 20) | 51 μm–131 μm | 71 μm |
| I. Thickness of External Air Chamber Wall 20 | 111 μm–261 μm | 151 μm |
| J. Diameter of External Orifice 24 | 111 μm–261 μm | 151 μm |

With respect to elements H through J above, these dimensions are like those of the comparable components of the drop-on-demand ink jet head shown in U.S. Pat. No. 4,106,032 of Miura, et al.

Figure 5:
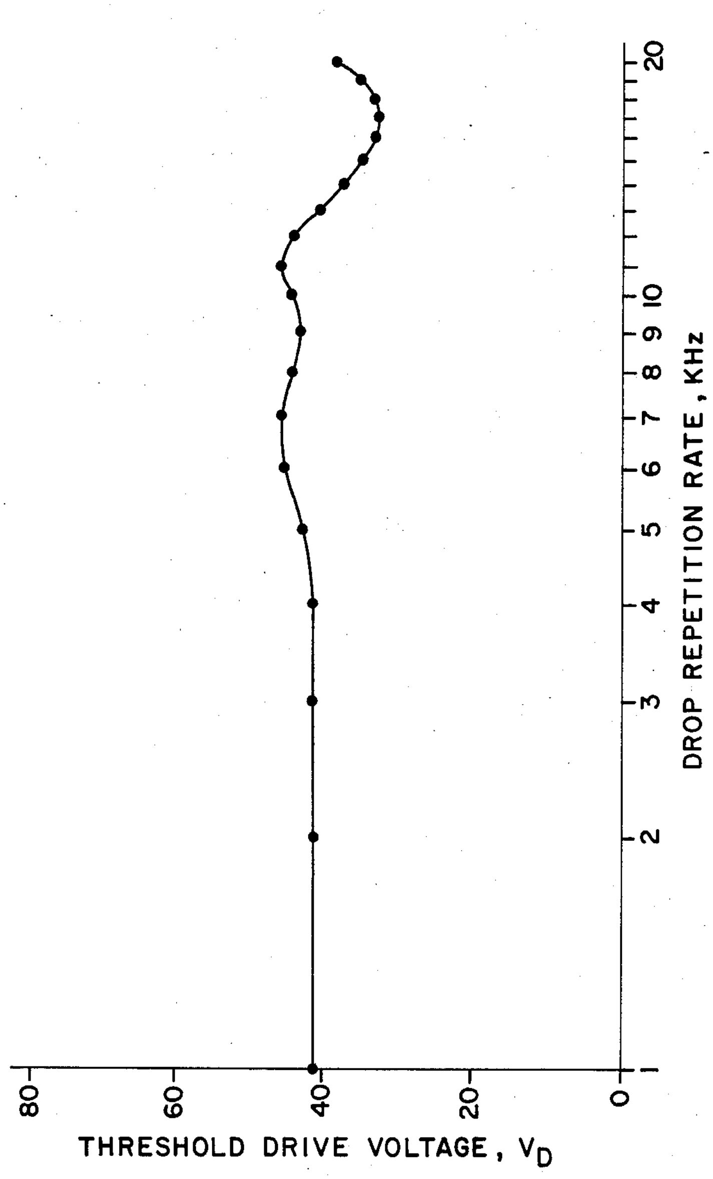
FIG. 5 is a graph plotting the threshold drive voltage applied to the actuator of the FIG. 1 ink jet head in order to generate ink drops at various drop repetition rates.

Thus, a single ink chamber air-assisted drop-on-demand ink jet head capable of operating at extremely high drop repetition rates is provided. With the ink jet head of the present invention, the drop formation process is stabilized, with one uniform dot being produced on the printing medium per pressure pulse. Moreover, with reference to FIG. 5, a relatively constant peak to peak drive voltage, $V_D$, is required to generate ink drops over a wide range of drop repetition rates. In addition, a typical peak to peak drive voltage required by an ink jet head of the present invention is about forty volts over the full range of drop-repetition rates, through and including twenty kilohertz. In contrast, known air assisted drop-on-demand ink jet heads typically require drive voltages which are substantially higher. Therefore, drive circuits utilized in operating ink jet heads in accordance with the present invention can be simplified, while still producing the desired results.

A method and apparatus for purging contaminants and air bubbles from an ink jet head will next be described with reference to FIGS. 6 and 7. This method and apparatus may be used in conjunction with a wide variety of ink jet heads, in addition to the ink jet head of FIG. 1. For example, it is suitable for air and non-air assisted ink jet heads. This purging capability facilitates the initial filling of dry ink jet heads, the filling of ink jet heads which contain some ink, storage of ink jet heads, purging of bubbles and other contaminants from ink jet heads and the transportation of such heads. For example, conventional ink jet heads, when filled with ink and shipped at high altitudes by airline, are somewhat prone to outgassing of air bubbles into the ink within such ink jet heads. These bubbles can be very difficult to purge and also interfere with the performance of the ink jet head. Consequently, conventional ink jet heads, must be packed and shipped with extreme care. By providing an easily accomplished method and apparatus for purging bubbles, any bubbles ingested during storage and shipment of an ink jet head can readily be removed. In addition, the illustrated method and apparatus permits in situ purging of contaminants and air bubbles from ink jet heads without the need for removing the heads from an ink jet printer. This minimizes down time for such printers and makes the entire purging procedure much easier. Moreover, the purging operation can be accomplished in only a few seconds. Also, purging typically requires only a very small fraction of the volume of ink in ink cartridges commonly used with ink jet heads.

Figure 7:
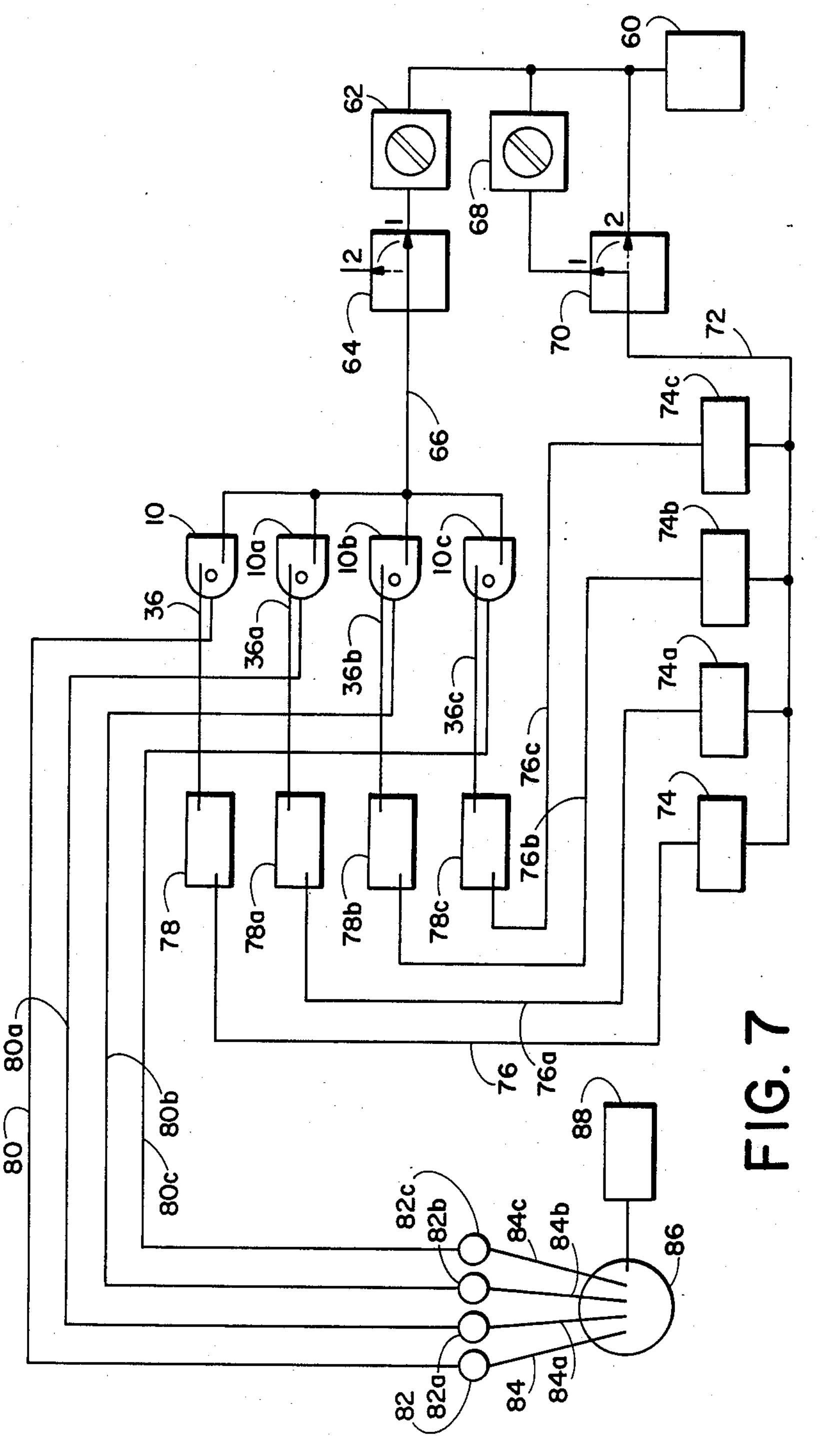
FIG. 7 is a schematic diagram of an array of ink jet heads of the type shown in FIG. 1, together with a contaminant and air bubble purging system controlled by the circuit of FIG. 6.

With reference to FIG. 7, an array of ink jet heads 10, **10*a*, 10*b* and 10*c*, such as the type in FIG. 1, are shown. During normal operation of this array, air under a positive pressure from an air pump 60 is delivered through a pressure regulator 62, through a closed solenoid controlled valve 64 (shown in a first position) to a line 66 and then to the air supply inlets of the respective ink jet heads. In addition, air from pump 60 passes through another regulator 68, through a solenoid controlled valve 70, through a line 72, and to the air pressure side of a set of conventional ink jet cartridges 74, 74*a*, 74*b* and 74*c***. Exemplary cartridges include those shown in U.S. Pat. No. 4,551,734 of Causley et al.

The ink delivery side of cartridge 74 is connected through a line 76, a conventional bubble trap 78 and to the ink supply inlet 36 of ink jet head 10. The ink supply sides of the cartridges **74*a*–74*c* are respectively coupled by lines 76*a*–76*c*, through bubble traps 78*a*–78*c*, and to the ink supply inlets 36*a*–36*c* of ink jet heads 10*a*–10*c*. The purging outlet of ink jet head 10 is coupled by a line 80 to one side of a normally closed purging valve 82. The other side of valve 82 is connected by a line 84 to a purging tank 86, which may be a closed vessel in which a vacuum is drawn by an optional vacuum pump 88. In the same manner, the purging outlets of the ink jet heads 10*a*–10*c* are connected by respective lines 80A–80C to solenoid controlled valves 82*a*–82*c*. These latter valves are connected by respective lines 84*a*–84*c* to the purging tank 86**.

During one purging process in accordance with the invention, solenoid controlled valve 70 is shifted to a second position, shown in FIG. 7, so as to couple the air pump 60 to the line 72 and bypass the pressure regulator 68. This increases the pressure on ink in the ink cartridges **74—74*c*. An exemplary pressure increase is approximately four pounds-per-square-inch. This pressure increase produces a corresponding pressure increase at the respective ink supply inlets 36—36*c* and increases the pressure of the ink within the ink chambers of the ink jet heads. At the same time, although not necessarily so, the solenoid controlled valves 82—82*c* are opened to thereby open the purging outlets of each of the ink jet heads 10—10*c*. When this happens, ink flows from the ink supply inlet of each ink jet head, through the ink chambers and purging outlets of the heads, and to the purging tank 86. In addition, a small amount of ink, for example, approximately twenty percent of the mass flow, will pass through the orifice passageway 22** of each of the ink jet heads in addition to the ink which exits via the purging outlets. The resulting flow of ink through the ink chambers sweeps contaminants and bubbles from the chambers. Because the ink does not pass through a restricted orifice between the inlet and purging outlet, the velocity of ink flow through the ink chamber increases rapidly after purging is started and assists the purging process.

In addition, as previously explained, the FIG. 1 form of ink jet head has an ink supply passageway 38 and a purging passageway 40 at an opposite ends of the ink chamber from one another. These passageways are positioned such that the ink flows in a non-linear path through the ink chamber during purging. This facilitates the sweeping of contaminants and bubbles from the ink chamber. As shown in FIG. 3, by introducing the ink tangentially into the ink chamber 14, the ink follows in a cyclone-like or vortical path through the ink chamber. This tends to sweep bubbles and contaminants clinging to the ink chamber walls from the ink chamber. In addition, by introducing the ink tangentially into the ink chamber and by removing the ink tangentially from the ink chamber, areas of low velocity ink flow or stagnation areas within the ink chamber are minimized. Consequently, areas of low dynamic pressure within the ink chamber are substantially eliminated during purging to enhance the effectiveness of the purging. Following purging for a few seconds, typically no more than from two to twenty seconds, valves **82—82*c* are closed to shut off the purging outlets. Valve 70 is also shifted to its first position so as to again deliver regulated air to the ink cartridges. During the purging operation, solenoid valve 64 may be shifted to its second position to vent air from line 66. This prevents the delivery of air to the air chambers of ink jet heads 10—10*c*** during the purging operation.

In addition to, or typically instead of, elevating the pressure within the ink cartridges during purging, the following purging method may be employed. In this alternate approach, the vacuum pump 88 is employed to draw a vacuum, for example a negative four pounds-per-square-inch vacuum, in vessel 86. During purging, the valves **82—82*c* are opened so that this negative pressure is applied to the purging outlets of the ink jet heads 10—10*c*. At the same time, valve 64 may be moved to its vent position and valve 70** is typically left in the position shown in FIG. 7 so that a normal positive pressure exists at the ink inlet. Because of the negative pressure at the purging outlets, ink not only flows from the supply inlet of each ink jet head to the purging outlet, but the velocity of ink flow is increased. With this approach, very little ink typically flows through the ink orifice passageways. Consequently, the remote chance of forcing contaminants and bubbles into these passageways and clogging the ink jet heads during the purging operation is reduced.

As a further purging approach, an ink jet head which is wetted with fluid is drained through the purging outlet. When refilled, because the walls of the ink chamber are wetted (i.e. by ink or other fluid), removal of air bubbles during the purging operation is facilitated. For example, a dry ink jet head may be initially wetted and then purged in this manner. Alternately, an ink jet head which is wetted during normal operation may be drained and purged accordingly.

Figure 6:
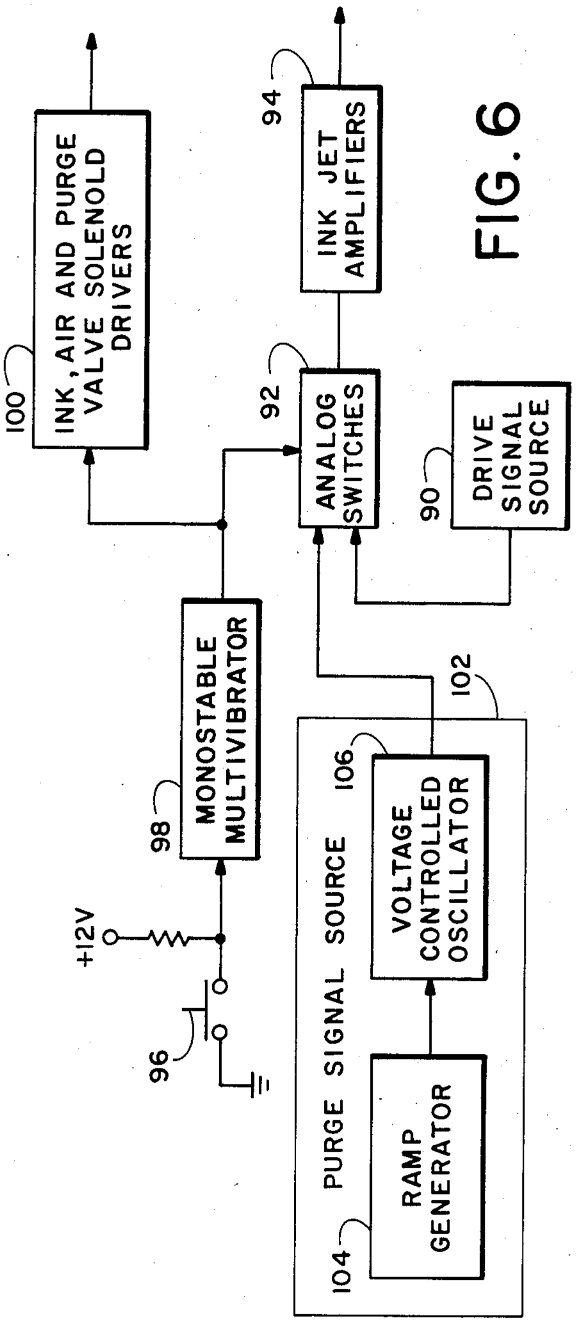
FIG. 6 is a block diagram of an electrical circuit which controls the purging of air bubbles and contaminants from the ink jet head of FIG. 1.

Turning to FIG. 6, during normal operation of an ink jet head, drive signals, such as sinusoidal signals, at a desired frequency are obtained from a conventional signal source 90. These signals are delivered through analog switches 92 and through ink jet amplifiers to the piezoelectric crystal of each ink jet head of an ink jet head array. To initiate a purging operation, a switch 96 is closed to trigger a monostable multivibrator 98. When triggered, the multivibrator 98 produces an output to ink and air valve solenoid drivers 100 and to the analog switches 92. While the monostable multivibrator is producing such an output signal, drivers 100 control the valves 64, 70 and **82—82*c* as previously explained to accomplish the purging operation. In addition, the analog switches 92 are controlled during this time to block the application of drive signals to the piezoelectric crystals of the ink jet heads from source 90**. When the monostable multivibrator output signal ends, the valves return to their normal position so that normal operation of the ink jet heads resumes.

As an additional option, a purge signal source 102 may be provided. This source is coupled by the analog switches 92 to the ink jet amplifiers 94 during the purging operation. Purge signal source 102 comprises a ramp generator circuit 104 for applying a ramp voltage to a voltage controlled oscillator 106. In response to the ramp voltage output from the ramp generator, the voltage controlled oscillator produces a sinusoidal output which is varied from approximately five kilohertz to about one hundred kilohertz. This sweeping frequency signal, when applied to the piezoelectric crystals of the ink jet heads, causes any bubbles in the ink chamber to oscillate. Oscillation is enhanced when the applied frequency is at the natural resonance frequency of the bubbles. As the bubbles oscillate, they tend to break up and dislodge from the walls of the ink chamber. This makes the bubbles easier to sweep from the ink chamber during the purging operation. Again, the frequency of the applied purging signal is continuously varied over a range, as compared to applying a few isolated purging signal frequencies. Because of this, virtually any bubble of significant size within the ink chamber will be subjected to an applied signal at the natural resonance frequency of the bubble. Consequently, removal of the bubbles is enhanced. It should be emphasized that successful purging typically is accomplished by the previously described purging cycles without subjecting ink jet heads to a variable frequency purging signal. However, particularly when initially filling a dry ink jet head, in some cases the application of a variable frequency purging signal has removed bubbles that were not removed in the absence of such a signal.

Having illustrated and described the principles of our invention with reference to several preferred embodiments, it should be apparent to those persons skilled in the art that such invention may be modified in arrangement and detail without departing from such principles. We claim as our invention all such modifications as come within the true spirit and scope of the following claims.

We claim:

1. An ink jet head for generating ink drops at a predetermined maximum operating frequency, the ink jet head including an ink chamber which has an ink supply inlet for receiving ink under pressure, the ink chamber having an ink chamber wall with a valve free ink orifice passageway leading to an internal ink drop-forming orifice outlet;

an actuator means for producing pressure pulses in the ink chamber so as to cause ink to flow through the ink orifice and produce ink drops at the internal ink drop-forming orifice outlet;

an air chamber with an air chamber wall through which an external ink jet head orifice is provided in axial alignment with the internal ink drop-forming orifice outlet, the air chamber being adapted to receive pressurized air which flows inwardly from the sides of the air chamber to form a generally coaxial air stream surrounding the internal ink drop-forming orifice outlet and which air stream is directed out of the external ink jet head orifice, the air stream carrying ink drops produced at the internal ink drop-forming orifice outlet, in response to the pressure pulses, outwardly through the external ink jet head orifice and toward printing medium;

the actuator means comprising a diaphragm plate in contact with ink in the ink chamber and a piezoelectric crystal mounted to the diaphragm plate, the actuator means having a natural resonance frequency which is greater than or equal to two and one-half times the maximum operating frequency;

the ink orifice passageway and ink chamber being sized such that ink in the ink orifice passageway has a natural resonance frequency which is greater than or equal to seventy-five percent of the maximum operating frequency but which is not from ninety to one-hundred and ten percent of the maximum operating frequency; and the ink supply inlet having a cross-sectional area sized small enough so as to not significantly alter the magnitude, frequency and damping rate of the pressure pulses in the ink chamber and large enough to permit filling of the ink chamber as ink drops are produced.

2. An ink jet head according to claim 1 in which the natural resonance frequency of the actuator means is from one hundred kilohertz to two bundred kilohertz.

3. An ink jet head according to claim 1 in which the ink chamber has a longitudinal axis and is symmetric about such axis, the ink passageway and external ink jet head orifice being aligned with the longitudinal axis, the ink chamber when filled with ink having a natural resonance frequency in the direction of such axis of at least approximately four hundred kilohertz.

4. An ink jet head according to claim 3 in which the ink chamber wall has a natural resonance frequency which is greater than eight hundred and fifty kilohertz.

5. An ink jet head according to claim 4 in which the ink orifice passageway is sized such that the natural resonance frequency of ink inside the ink orifice passageway is greater than fifteen kilohertz.

6. An ink jet head according to claim 5 in which the actuator generates a peak positive pressure in the ink within the ink chamber which is from five pounds per square inch to twenty pounds per square inch.

7. An ink jet head according to claim 6 in which the actuator generates a peak negative pressure in ink within the ink chamber which is at least approximately negative two pounds per square inch.

8. An ink jet head comprising:

a single compartment ink chamber which has an ink supply inlet for receiving ink under pressure, the ink chamber having an ink chamber wall with at least one valve free ink orifice passageway leading to an internal ink drop-forming orifice outlet;

an actuator means for producing pressure pulses in the ink chamber so as to cause ink to flow through the ink passageway and produce ink drop at the internal ink drop-forming orifice outlet;

the ink orifice passageway being the only ink outlet that is open for ink to exit the ink chamber during ink drop formation;

an air chamber with an air chamber wall through which an external ink jet head orifice is provided in axial alignment with the internal ink drop-forming orifice outlet, the air chamber being adapted to receive pressurized air which flows inwardly from the sides of the air chamber to form a generally coaxial air stream surrounding the internal ink drop-forming orifice outlet and which air stream is directed out of the external ink jet head orifice, the air stream carrying ink drops produced at the internal ink drop-forming orifice outlet, in response to the pressure pulses, outwardly through the external ink jet head orifice and toward printing medium.

9. An ink jet head according to claim 8 in which the ink chamber has a longitudinal axis, and in which the ink chamber has a length, the length comprising the spacing from the ink orifice passageway to the actuator means along the longitudinal axis, from approximately 700 $\mu m$ to approximately 2500 $\mu m$.

10. An ink jet head according to claim 9 in which the ink chamber wall comprises a plate which is from 50 μm to 130 μm thick in the direction of the longitudinal axis.

11. An ink jet head according to claim 10 in which the ink chamber length is approximately 1150 μm and the ink chamber wall is approximately 75 μm thick.

12. An ink jet head according to claim 11 in which the ink inlet has a cross sectional area from approximately 9300 square μm to 31,300 square μm.

13. An ink jet head according to claim 12 having a purging outlet communicating with the ink chamber and having a cross-sectional area which is from approximatey 9300 square μm to 31,300 square μm.

14. An ink jet head according to claim 9 in which the actuator means comprises a diaphragm plate in contact with ink in the ink chamber and a piezoelectric crystal mounted to the diaphram plate, the actuator means having a natural reasonance frequency which is from one hundred to two hundred kilohertz; the ink chamber has a longitudinal axis and is symmetric about such axis, the ink passageway and external ink jet head orifice being aligned with the longitudinal axis, the ink chamber when filled with ink having a natural acoustic frequency in the direction of such axis of at least approximately four hundred eight kilohertz; the ink orifice passageway is sized such that the natural resonance frequency of ink inside the ink orifice passageway is greater than fifteen kilohertz but not between eighteen kilohertz and twenty-two kilohertz; and in which the ink chamber wall has a natural resonance frequency which is greater than eight hundred and fifty kilohertz.

15. An ink jet head for generating ink drops at a predetermined maximum operating frequency, the ink jet head including an ink chamber which has an ink supply inlet for receiving ink under pressure, the ink chamber haivng an ink chamber wall with a valve free ink orifice passageway leading to an ink drop-forming orifice outlet;

- an actuator means for producing pressure pulses in the ink chamber so as to cause ink to flow through the ink orifice and produce ink drops at the internal ink drop-forming orifice outlet;
- the actuator means comprising a diaphragm plate in contact with ink in the ink chamber and a piezoelectric crystal mounted to the diaphragm plate, the actuator means having a natural resonance frequency which is greater than or equal to two and one-half times the maximum operating frequency;
- the ink orifice passageway and ink chamber being sized such that ink in the ink orifice passageway has a natural resonance frequency which is greater than or equal to seventyfive percent of the maximum operating frequency but which is not from ninety to one-hundred and ten percent of the maximum operating frequency; and
- the ink supply inlet having a cross-sectional area sized small enough so as to not significantly alter the magnitude, frequency and damping rate of the pressure pulses in the ink chamber and large enough to permit filling of the ink chamber as ink drops are produced.

16. An ink jet head according to claim 15 in which the ink chamber has a longitudinal axis and is symmetric about such axis, the ink passageway and external ink jet head orifice beign aligned with the longitudinal axis, the ink chamber when filled with ink haivng a natrural resonance frequency in the direction of such axis of at least approximately four hundred kilohertz.

17. An ink jet head according to claim 16 in which the ink orifice passageway is sized such that the natural resonance frequency of ink inside the ink orifice passageway is greater than fifteen kilohertz.

* * * * *